US012640034B2

(12) United States Patent
Tanaka

(10) Patent No.: US 12,640,034 B2
(45) Date of Patent: May 26, 2026

(54) TRAJECTORY INFORMATION COLLECTING DEVICE, METHOD, AND COMPUTER PROGRAM FOR COLLECTING TRAJECTORY INFORMATION

(71) Applicant: Woven by Toyota, Inc., Tokyo (JP)

(72) Inventor: Masahiro Tanaka, Edogawa-ku (JP)

(73) Assignee: Woven by Toyota, Inc., Tokyo (JP)

( * ) Notice: Subject to any disclaimer, the term of this patent is extended or adjusted under 35 U.S.C. 154(b) by 133 days.

(21) Appl. No.: 18/631,789

(22) Filed: Apr. 10, 2024

(65) Prior Publication Data

US 2024/0378995 A1 Nov. 14, 2024

(30) Foreign Application Priority Data

May 9, 2023 (JP) ................................ 2023-077222

(51) Int. Cl.
*G08G 1/00* (2006.01)
*G08G 1/04* (2006.01)
*G08G 1/056* (2006.01)

(52) U.S. Cl.
CPC ............... *G08G 1/056* (2013.01); *G08G 1/04* (2013.01); *G08G 1/20* (2013.01)

(58) Field of Classification Search
CPC ............ G08G 1/056; G08G 1/04; G08G 1/20; G08G 1/0112; G08G 1/0129; G08G 1/00
USPC .......................................................... 701/117
See application file for complete search history.

(56) References Cited

U.S. PATENT DOCUMENTS

2019/0294167 A1* 9/2019 Kutila .............. G08G 1/096827
2020/0098203 A1* 3/2020 Uno ..................... G08G 1/0129
2020/0302789 A1* 9/2020 Oyama .............. G01C 21/3407
2021/0318138 A1 10/2021 Muto
2023/0120095 A1* 4/2023 Horihata .......... G08G 1/096775 701/301

FOREIGN PATENT DOCUMENTS

JP 2015-075423 A 4/2015
JP 2018-022353 A 2/2018
JP 2020-101745 A 7/2020
JP 2020-126505 A 8/2020
WO 2021/261228 A1 12/2021

* cited by examiner

*Primary Examiner* — Shardul D Patel
(74) *Attorney, Agent, or Firm* — Dinsmore & Shohl LLP

(57) ABSTRACT

A trajectory information collecting device includes a processor configured to determine whether a trajectory along which a host vehicle has traveled through a predetermined section is within a predetermined standard travel area, generate trajectory information by including individual position coordinates on the trajectory in the trajectory information when the trajectory is within the standard travel area, generate the trajectory information by including individual position coordinates on the trajectory and operation information indicating how much the host vehicle is operated by a driver in the predetermined section in the trajectory information when the trajectory deviates from the standard travel area, and transmit the generated trajectory information to a server via a communication device mounted on the host vehicle.

8 Claims, 6 Drawing Sheets

TRAJECTORY INFORMATION COLLECTING DEVICE, METHOD, AND COMPUTER PROGRAM FOR COLLECTING TRAJECTORY INFORMATION

CROSS-REFERENCE TO RELATED APPLICATIONS

This application claims priority to Japanese Patent Application No. 2023-077222 filed May 9, 2023, the entire contents of which are herein incorporated by reference.

FIELD

The present disclosures relates to a trajectory information collecting device, a method, and a computer program for collecting trajectory information representing a trajectory along which a vehicle has traveled.

BACKGROUND

A technique has been proposed to generate data representing an area where vehicles can travel in an individual road section as a piece of information to be included in a highly precise map to which an autonomous vehicle-driving system refers for autonomous driving control of a vehicle (see Japanese Unexamined Patent Publication JP2020-101745A).

A map data generating device disclosed in JP2020-101745A statistically processes data of straddling trajectories from a start section of a first lane to an end section of a second lane. The map data generating device excludes data of straddling trajectories deviating from a predetermined area, and then generates travelable area data representing an area where a vehicle can actually travel using an autonomous driving function or a driver assisting function.

SUMMARY

The actual trajectory of a vehicle is affected by the circumstances of the vehicle, and may thus be an abnormal trajectory departing from a lane being traveled by the vehicle. It is desirable that such an abnormal trajectory can be separated from normal trajectories and collected.

It is an object of the present disclosure to provide a trajectory information collecting device that can collect information on an abnormal trajectory of a vehicle.

According to an embodiment, a trajectory information collecting device is provided. The trajectory information collecting device includes a processor configured to: determine whether a trajectory along which a host vehicle has traveled through a predetermined section is within a predetermined standard travel area, generate trajectory information by including individual position coordinates on the trajectory in the trajectory information when the trajectory is within the standard travel area, generate the trajectory information by including individual position coordinates on the trajectory and operation information indicating how much the host vehicle is operated by a driver in the predetermined section in the trajectory information when the trajectory deviates from the standard travel area, and transmit the generated trajectory information to a server via a communication device mounted on the host vehicle.

The trajectory information collecting device further includes a memory configured to store information representing a reference trajectory in the predetermined section. The processor determines that the trajectory deviates from the standard travel area, when a deviation of the trajectory from the reference trajectory at a position on the trajectory is greater than a predetermined acceptable distance corresponding to the standard travel area.

Alternatively, the processor is further configured to detect a lane line defining a lane traveled by the host vehicle in the predetermined section from an image obtained by a camera mounted on the host vehicle. The processor sets the standard travel area, based on the detected lane line.

Alternatively, the processor is further configured to detect another vehicle traveling in an area around the host vehicle during travel of the host vehicle in the predetermined section from a sensor signal representing surroundings of the host vehicle obtained by a sensor mounted on the host vehicle, and estimate the relationship of the position of the detected vehicle to the host vehicle. The processor includes relative position information indicating the relationship of the position of the detected vehicle to the host vehicle at a position on the trajectory in the trajectory information when the trajectory deviates from the standard travel area.

According to another embodiment, a method for collecting trajectory information is provided. The method includes determining whether a trajectory along which a host vehicle has traveled through a predetermined section is within a predetermined standard travel area; generating trajectory information by including individual position coordinates on the trajectory in the trajectory information when the trajectory is within the standard travel area; generating the trajectory information by including individual position coordinates on the trajectory and operation information indicating how much the host vehicle is operated by a driver in the predetermined section in the trajectory information when the trajectory deviates from the standard travel area; and transmitting the generated trajectory information to a server via a communication device mounted on the host vehicle.

According to still another embodiment, a non-transitory recording medium that stores a computer program for collecting trajectory information is provided. The computer program includes instructions causing a computer to execute a process including determining whether a trajectory along which a host vehicle has traveled through a predetermined section is within a predetermined standard travel area; generating trajectory information by including individual position coordinates on the trajectory in the trajectory information when the trajectory is within the standard travel area; generating the trajectory information by including individual position coordinates on the trajectory and operation information indicating how much the host vehicle is operated by a driver in the predetermined section in the trajectory information when the trajectory deviates from the standard travel area; and transmitting the generated trajectory information to a server via a communication device mounted on the host vehicle.

The trajectory information collecting device according to the present disclosure has an effect of being able to collect information on an abnormal trajectory of a vehicle.

DESCRIPTION OF EMBODIMENTS

A trajectory information collecting device, a method for collecting trajectory information executed by the trajectory information collecting device, and a computer program for collecting trajectory information will now be described with reference to the attached drawings. The trajectory information collecting device is mounted on a host vehicle, generates trajectory information representing a trajectory of the vehicle along which the vehicle has traveled through a predetermined section, and uploads the trajectory information to a server. In particular, the trajectory information collecting device determines whether the trajectory along which the vehicle has traveled through a predetermined section is within a predetermined standard travel area. When the trajectory is within the standard travel area, the trajectory information collecting device generates trajectory information by including individual position coordinates on the trajectory in the trajectory information. When the trajectory deviates from the standard travel area, the trajectory information collecting device generates trajectory information by including individual position coordinates on the trajectory and operation information indicating how much the vehicle is operated by a driver in the predetermined section in the trajectory information.

Figure 1:
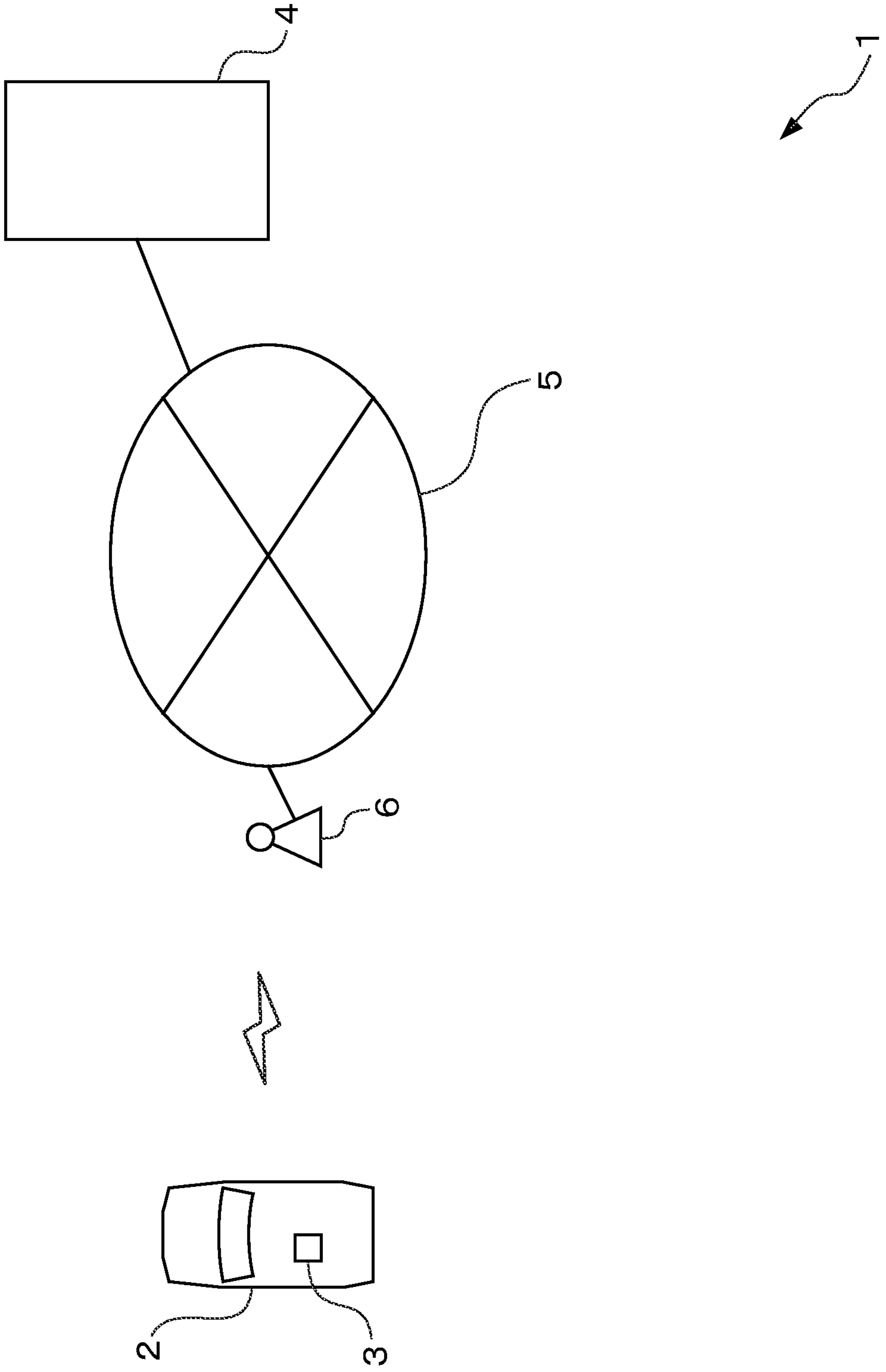
FIG. 1 schematically illustrates the configuration of a trajectory information collecting system equipped with a trajectory information collecting device.

FIG. 1 schematically illustrates the configuration of a trajectory information collecting system equipped with the trajectory information collecting device. In the present embodiment, the trajectory information collecting system 1 includes a trajectory information collecting device 3 mounted on at least one vehicle 2 as well as a server 4. The trajectory information collecting device 3 accesses a wireless base station 6, which is connected via a gateway (not illustrated) to a communication network 5 connected with the server 4, thereby connecting to the server 4 via the wireless base station 6 and the communication network 5. FIG. 1 illustrates only a single vehicle 2, but the trajectory information collecting system 1 may include multiple vehicles 2 each equipped with a trajectory information collecting device 3. Similarly, the communication network 5 may be connected with multiple wireless base stations 6.

The following describes the vehicle 2 and the trajectory information collecting device 3. The trajectory information collecting system 1 may include multiple vehicles 2 each equipped with a trajectory information collecting device 3 as described above, but each vehicle 2 and each trajectory information collecting device 3 have the same configuration and execute the same processing in relation to a trajectory information collecting process. Thus the following describes a single vehicle 2 and a single trajectory information collecting device 3.

Figure 2:
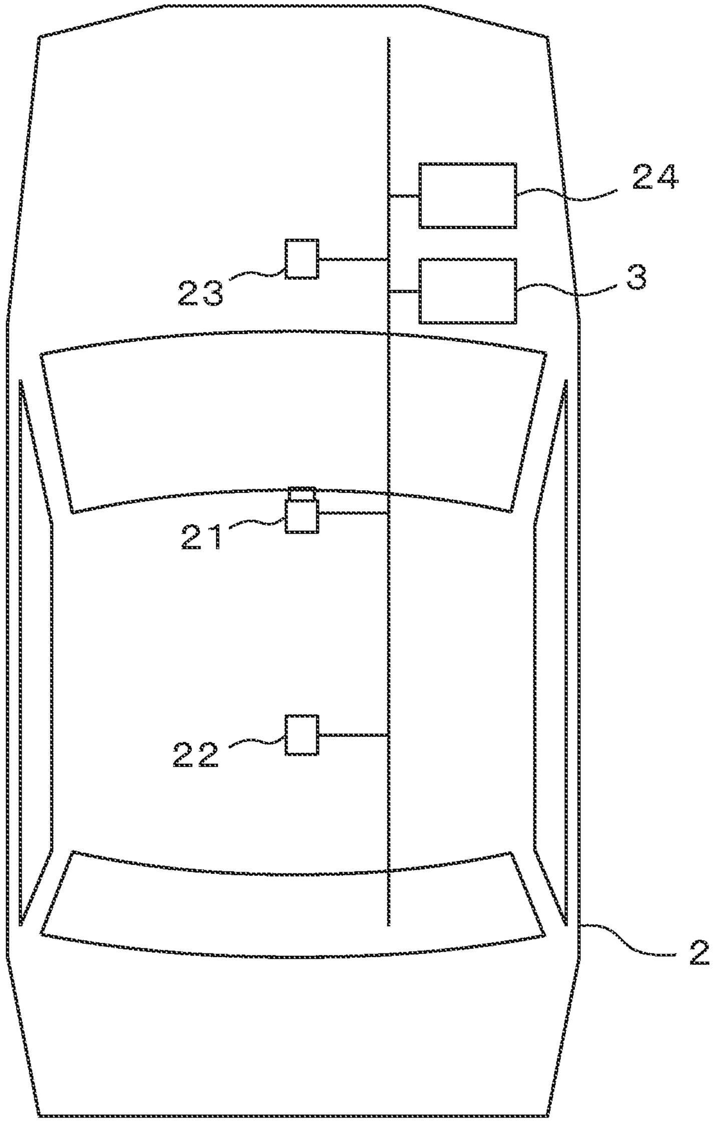
FIG. 2 schematically illustrates the configuration of a vehicle.

FIG. 2 schematically illustrates the configuration of the vehicle 2. The vehicle 2 includes a camera 21 for taking pictures of an area around the vehicle 2, a GPS receiver 22, a wireless communication terminal 23, and a vehicle controller (ECU) 24, in addition to the trajectory information collecting device 3. The camera 21, the GPS receiver 22, the wireless communication terminal 23, the ECU 24, and the trajectory information collecting device 3 are communicably connected via an in-vehicle network conforming to a standard such as a controller area network. The vehicle 2 may further include a range sensor (not illustrated) for measuring the distance to an object in an area around the vehicle 2, such as a LiDAR sensor.

The camera 21, which is an example of a sensor configured to detect surroundings of the vehicle 2, includes a two-dimensional detector constructed from an array of optoelectronic transducers, such as CCD or C-MOS, having sensitivity to visible light and a focusing optical system that forms an image of a target region on the two-dimensional detector. The camera 21 is mounted, for example, in the interior of the vehicle 2 so as to be oriented, for example, to the front of the vehicle 2. The camera 21 takes pictures of a region in front of the vehicle 2 every predetermined capturing period (e.g., 1/30 to 1/10 seconds), and generates images representing the region. Each image obtained by the camera 21 is an example of a sensor signal representing the surroundings of the vehicle 2, and may be a color or grayscale image. The vehicle 2 may include multiple cameras 21 taking pictures in different orientations or having different focal lengths.

Every time an image is generated, the camera 21 outputs the generated image, together with the time of generation thereof, to the trajectory information collecting device 3 via the in-vehicle network.

The GPS receiver 22 receives GPS signals from GPS satellites at predetermined intervals, and determines the position of the vehicle 2, based on the received GPS signals. The GPS receiver 22 outputs positioning information indicating the result of determination of the position of the vehicle 2 based on the GPS signals, together with the time of generation thereof, to the trajectory information collecting device 3 via the in-vehicle network at predetermined intervals. Instead of the GPS receiver 22, the vehicle 2 may include a receiver conforming to another satellite positioning system. In this case, the receiver determines the position of the vehicle 2.

The wireless communication terminal 23, which is an example of the communication device, is a device to execute a wireless communication process conforming to a predetermined standard of wireless communication, and accesses, for example, the wireless base station 6 to connect to the server 4 via the wireless base station 6 and the communication network 5. In other words, a communication channel is established between the wireless communication terminal 23 and the server 4 via the wireless base station 6 and the communication network 5. The wireless communication terminal 23 receives, from the server 4, a downlink radio signal including information representing a collection target region including a section where trajectory information will be collected, and outputs the received information to the trajectory information collecting device 3. Further, the wireless communication terminal 23 generates an uplink radio signal including trajectory information received from the trajectory information collecting device 3. The wireless communication terminal 23 transmits the uplink radio signal to the wireless base station 6, thereby transmitting the trajectory information to the server 4.

The ECU 24 controls components of the vehicle 2 according to operation by the driver. In addition, the ECU 24 outputs operation information indicating how much the vehicle 2 is operated by the driver to the trajectory information collecting device 3 at predetermined intervals. The operation information includes at least one of a steering angle, the degree of accelerator opening, and the amount of braking as well as the time of detection of the driver's operation indicated by the operation information.

Figure 3:
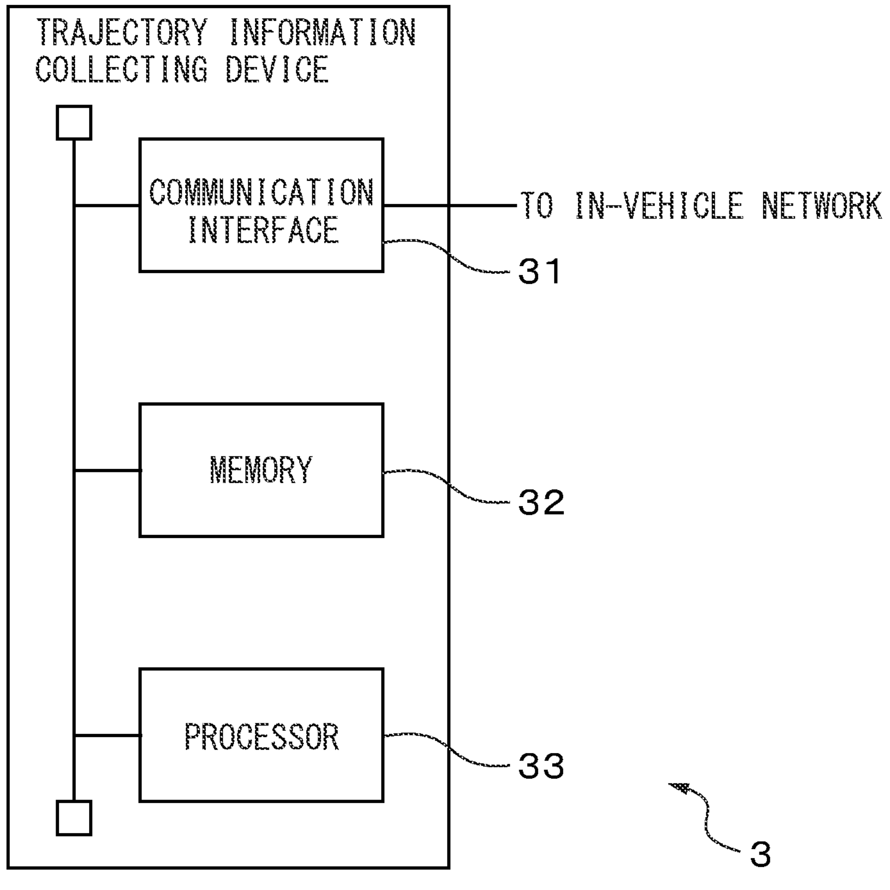
FIG. 3 illustrates the hardware configuration of the trajectory information collecting device according to an embodiment.

FIG. 3 illustrates the hardware configuration of the trajectory information collecting device 3. The trajectory information collecting device 3 generates trajectory information representing a trajectory along which the vehicle 2 has traveled through a predetermined section, and transmits the generated trajectory information to the server 4 via the wireless communication terminal 23. To achieve this, the trajectory information collecting device 3 includes a communication interface 31, a memory 32, and a processor 33.

The communication interface 31, which is an example of an in-vehicle communication unit, includes an interface circuit for connecting the trajectory information collecting device 3 to the in-vehicle network. In other words, the communication interface 31 is connected to the camera 21, the GPS receiver 22, the wireless communication terminal 23, and the ECU 24 via the in-vehicle network. Every time an image is received from the camera 21, the communication interface 31 passes the received image to the processor 33. Every time positioning information is received from the GPS receiver 22, the communication interface 31 passes the received positioning information to the processor 33. Every time information from the server 4, such as information representing a collection target region, is received from the wireless communication terminal 23, the communication interface 31 passes the information to the processor 33. Every time operation information is received from the ECU 24, the communication interface 31 passes the operation information to the processor 33. Further, the communication interface 31 outputs data received from the processor 33, such as trajectory information, to the wireless communication terminal 23 via the in-vehicle network.

The memory 32, which is an example of a storage unit, includes, for example, volatile and nonvolatile semiconductor memories. The memory 32 may further include other storage, such as a hard disk drive. The memory 32 stores various types of data used in a process related to collection of trajectory information executed by the processor 33 of the trajectory information collecting device 3. For example, the memory 32 stores identifying information of the vehicle 2, parameters of the camera 21, such as the focal length, the orientation, and the mounted position of the camera 21, and various parameters for specifying a classifier for detecting a detection target, such as a lane line and another vehicle, from an image received from the camera 21. Further, the memory 32 temporarily stores images received from the camera 21, positioning information received from the GPS receiver 22, operation information received from the ECU 24, and the times of generation thereof. In addition, the memory 32 stores information representing a collection target region, which includes information indicating the position and area of a predetermined section (e.g., coordinates of the endpoints of the predetermined section). The memory 32 may further store a high-precision map representing features used for detecting the position of the vehicle 2, such as lane lines, information representing a reference trajectory, information representing a standard travel area, and a computer program for implementing processes executed by the processor 33.

The processor 33 includes one or more central processing units (CPUs) and a peripheral circuit thereof. The processor 33 may further include another operating circuit, such as a logic-arithmetic unit, an arithmetic unit, or a graphics processing unit. The processor 33 executes a trajectory information collecting process during travel of the vehicle 2. Every time an image is received from the camera 21, the processor 33 stores the image, together with the time of generation thereof, in the memory 32. Every time positioning information is received from the GPS receiver 22, the processor 33 stores the positioning information, together with the time of generation thereof, in the memory 32. Every time operation information is received from the ECU 24, the processor 33 stores the operation information in the memory 32.

Figure 4:
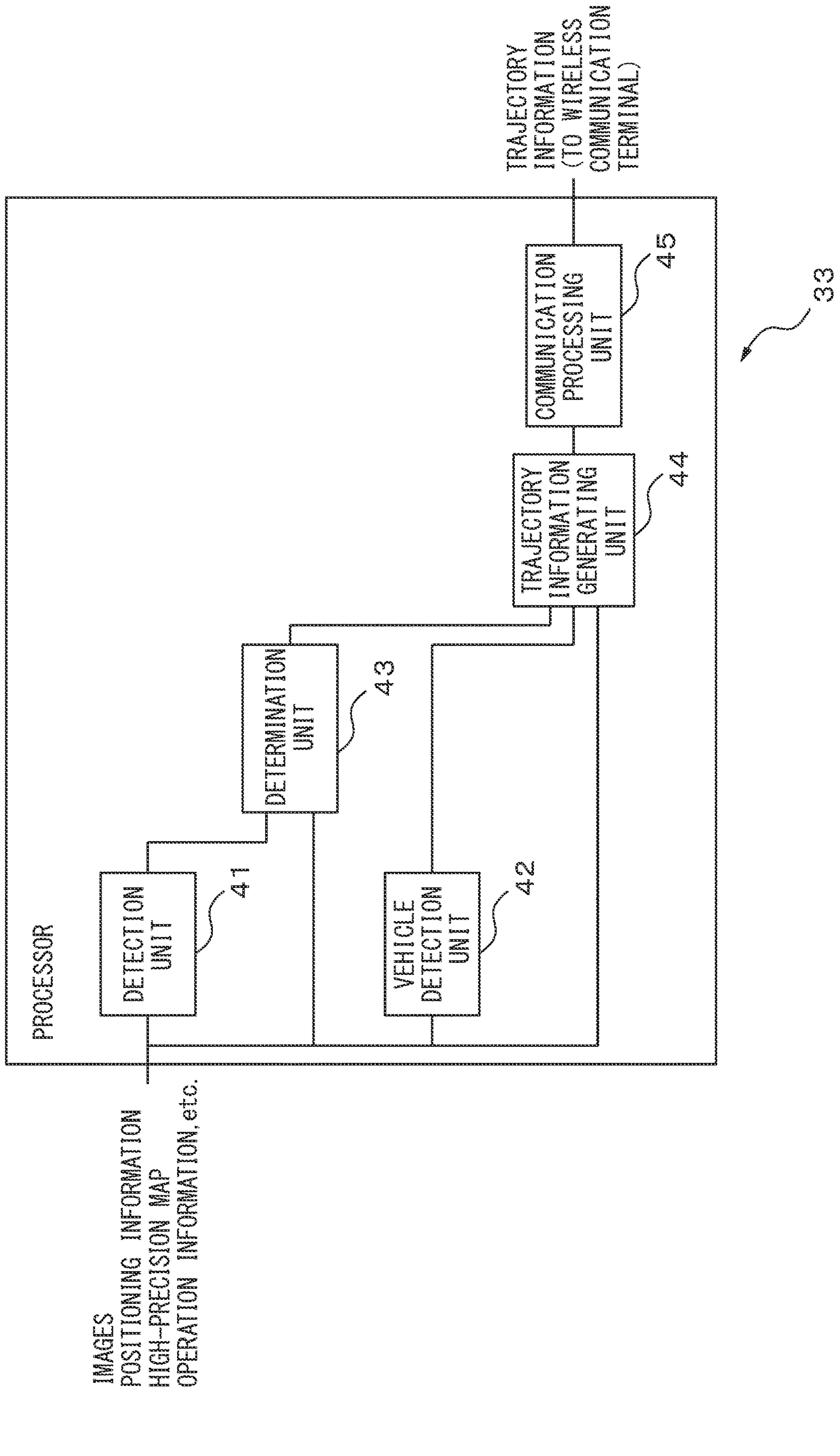
FIG. 4 is a functional block diagram of a processor of the trajectory information collecting device.

FIG. 4 is a functional block diagram of the processor 33 of the trajectory information collecting device 3. The processor 33 includes a detection unit 41, a vehicle detection unit 42, a determination unit 43, a trajectory information generating unit 44, and a communication processing unit 45. These units included in the processor 33 are functional modules, for example, implemented by a computer program executed by the processor 33, or may be dedicated operating circuits provided in the processor 33.

The processor 33 determines whether the vehicle 2 has entered a predetermined section, and executes a trajectory information collecting process upon entry of the vehicle 2 into a predetermined section. The predetermined section may be a road section included in a collection target region, and may be, for example, a section including a curved section, an intersection, a merge point, or a divergent point. However, the predetermined section is not limited to these sections, and may be a simple straight section.

The processor 33 determines whether the current position of the vehicle 2 indicated by the latest positioning information is within a predetermined section represented by information representing a collection target region. When the current position of the vehicle 2 is within the area of a predetermined section included in the information representing a collection target region, the processor 33 determines that the vehicle 2 has entered the predetermined section, and executes a trajectory information collecting process.

The detection unit 41 detects lane lines defining a lane traveled by the vehicle 2 in the predetermined section (hereafter a "host vehicle lane"). Specifically, upon entry of the vehicle 2 into a predetermined section, the detection unit 41 detects lane lines at predetermined intervals by inputting the latest image obtained by the camera 21 into a classifier that has been trained to detect lane lines. The detection unit 41 determines detected lane lines closest to the vehicle 2 in respective regions corresponding to the left and right of the vehicle 2 in the image, as lane lines defining the host vehicle lane.

The detection unit 41 may further detect a predetermined feature other than lane lines from an image by inputting the image into the classifier. The detected predetermined feature is used for detecting the position of the vehicle 2 accurately. Examples of the predetermined feature include at least one of a curbstone, a guardrail, a traffic sign, and a road marking other than a lane line, such as a stop line.

As the classifier, the detection unit 41 can use a deep neural network (DNN) having architecture of a convolutional neural network (CNN) type, such as Single Shot MultiBox Detector or Faster R-CNN. Alternatively, as the classifier, the detection unit 41 may use a DNN for semantic segmentation, such as Fully Convolutional Network or U-Net, a DNN having architecture of a self-attention network (SAN) type, such as Vision Transformer, or a classifier based on another machine learning technique, such as an AdaBoost classifier. Such a classifier is trained in advance with a large number of training images representing a detection target feature, such as a lane line, in accordance with a predetermined training technique, such as backpropagation, so as to detect the feature from an image. The classifier outputs information indicating an object region including a detection target feature in the inputted image and information indicating the type of the feature represented in the object region.

The detection unit 41 notifies the determination unit 43 of the position in the image and the type of the detected feature.

The vehicle detection unit 42 detects another vehicle traveling in an area around the vehicle 2 (hereafter referred to as a "vicinity vehicle" for convenience of description). To achieve this, upon entry of the vehicle 2 into a predetermined section, the vehicle detection unit 42 detects a vicinity vehicle at predetermined intervals by inputting the latest image obtained by the camera 21 into a classifier that has been trained to detect a vicinity vehicle.

As such a classifier, for example, the vehicle detection unit 42 can use a classifier similar to that used by the detection unit 41 for detecting lane lines. The classifier used by the detection unit 41 may also be trained in advance so as to detect a vicinity vehicle. In this case, the vehicle detection unit 42 is integrated with the detection unit 41.

In the case where the vehicle 2 includes a range sensor, the vehicle detection unit 42 may detect a vicinity vehicle by inputting a ranging signal obtained by the range sensor into a classifier. The range sensor is another example of a sensor configured to detect surroundings of the vehicle 2, and the ranging signal is another example of a sensor signal representing the surroundings of the vehicle 2. In this case also, as the classifier, the vehicle detection unit 42 can use a DNN having architecture of a CNN or SAN type, or a classifier based on another machine learning technique, such as a support vector machine.

When a vicinity vehicle is detected, the vehicle detection unit 42 determines relative position information indicating the relationship of the position of the vicinity vehicle to the vehicle 2. In the present embodiment, the relative position information includes the distance between the vehicle 2 and the vicinity vehicle and the direction from the vehicle 2 to the vicinity vehicle. The bottom position of an object region representing a vicinity vehicle in an image is assumed to correspond to the direction viewed from the camera 21 to the position at which the vicinity vehicle is on the road surface. Thus the vehicle detection unit 42 can estimate the distance between the vehicle 2 and the vicinity vehicle, based on the bottom position of the object region representing the vicinity vehicle in an image and parameters of the camera 21, such as the orientation, the focal length, and the height of the mounted position. The vehicle detection unit 42 further determines the direction from the camera 21 corresponding to the centroid position of the object region representing the vicinity vehicle in the image as the direction from the vehicle 2 to the vicinity vehicle. In the case where the vehicle 2 is equipped with a range sensor, the vehicle detection unit 42 may estimate that distance measured in the direction corresponding to the centroid position of the object region representing the vicinity vehicle in the image which is indicated by a ranging signal obtained by the range sensor at the time of generation of the image, as the distance between the vehicle 2 and the vicinity vehicle. Alternatively, when the vicinity vehicle is detected based on a ranging signal, the vehicle detection unit 42 may estimate that distance measured in the direction of the vicinity vehicle which is indicated by the ranging signal, as the distance between the vehicle 2 and the vicinity vehicle.

When multiple vicinity vehicles are detected, the vehicle detection unit 42 executes the above-described processing for each vicinity vehicle to determine relative position information for each vicinity vehicle.

The vehicle detection unit 42 notifies the trajectory information generating unit 44 of the relative position information determined for each vicinity vehicle.

The determination unit 43 determines whether a trajectory along which the vehicle 2 has traveled through a predetermined section is within a predetermined standard travel area. To achieve this, the determination unit 43 identifies the trajectory of the vehicle 2 in the predetermined section when the vehicle 2 exits the predetermined section. The determination unit 43 determines whether the vehicle 2 has exited a predetermined section by comparing the position of the vehicle 2 indicated by the latest positioning information with the predetermined section. In the following, the trajectory of the vehicle 2 in a predetermined section will be referred to simply as the "trajectory."

The determination unit 43 obtains odometry information of the vehicle 2 from the ECU 24, and determines the amount of travel and the change in orientation of the vehicle 2 in each interval of generation of images. The determination unit 43 then estimates the positions of the vehicle 2 at the times of generation of respective images, based on the features detected from the images as well as the amount of travel and the change in orientation of the vehicle 2 in each interval of generation of images, in accordance with the technique of "structure from motion (SfM)." The determination unit 43 determines the trajectory of the vehicle 2 by arranging coordinates of the estimated positions of the vehicle 2 at the times of generation of respective images in chronological order.

When a high-precision map is stored in the memory 32, the determination unit 43 may compare each image with the high-precision map, based on features detected from the image, to detect the position of the vehicle 2 at the time of generation of the image. In this case, assuming the position and orientation of the vehicle 2, the determination unit 43 projects features detected from an image onto the high-precision map or features in an area around the vehicle 2 represented in the high-precision map onto the image. The determination unit 43 estimates the actual position and orientation of the vehicle 2 to be the position and orientation of the vehicle 2 for the case where the features detected from the image match the features represented in the high-precision map the best.

In this case, the determination unit 43 determines the positions of the features in the high-precision map or the image to which the features are projected, using the assumed position and orientation of the vehicle 2 and parameters of the camera 21, such as the focal length, the height of the mounted position, and the orientation. As the initial values of the position and orientation of the vehicle 2 is used the position of the vehicle 2 indicated by the latest positioning information or a position obtained by correcting, with odometry information, the position and orientation of the vehicle 2 estimated at the last detection of the position of the vehicle 2. The determination unit 43 then calculates the degree of matching between the features detected from the image and corresponding features represented in the high-precision map (e.g., the inverse of the sum of squares of the distances between these features). The determination unit 43 repeats the above-described processing while varying the assumed position and orientation of the vehicle 2, and detects the assumed position and orientation for the case where the degree of matching is a maximum, as the actual position and orientation of the vehicle 2.

When the accuracy of the position of the vehicle 2 indicated by positioning information is sufficient, the determination unit 43 may arrange coordinates of the positions of the vehicle 2 indicated by positioning information in chronological order to determine the trajectory of the vehicle 2.

The determination unit 43 compares the determined trajectory with a standard travel area. The standard travel area may be an area along which the vehicle 2 is supposed to pass when the vehicle 2 travels so as not to violate road laws or regulations and not to pose a danger to the vehicle 2 itself or a vicinity vehicle. For example, the standard travel area is set between the two lane lines defining the host vehicle lane. In some embodiments, when the predetermined section is a section including an intersection, the standard travel area is set so as not to straddle a lane before or after the intersection.

The determination unit 43 sets a standard travel area, based on the two lane lines defining the host vehicle lane detected by the detection unit 41. In this case, the determination unit 43 determines the real-space positions of these lane lines, based on parameters of the camera 21, such as the height of the mounted position, the focal length, and the orientation of the camera 21, and the position and orientation of the vehicle 2 at the time of generation of an image from which these lane lines are detected. The determination unit 43 executes the above-described processing for each image generated during travel of the vehicle 2 through the predetermined section, and connects these lane lines detected from each image and projected into the real space, thereby determining the real-space positions of these lane lines over the whole predetermined section. The determination unit 43 then sets a standard travel area so as to be included between the two lane lines defining the host vehicle lane and to have boundaries closer to the center of the host vehicle lane than these lane lines by a predetermined safety distance (e.g., several dozen centimeters to two meters).

When a high-precision map is stored in the memory 32, the determination unit 43 may set a standard travel area, using lane lines in the predetermined section represented in the high-precision map, instead of the lane lines detected by the detection unit 41. In this case, the determination unit 43 determines a lane including the position of the vehicle 2 at the time of entry of the vehicle 2 into the predetermined section among individual lanes in the predetermined section represented in the high-precision map, as the host vehicle lane.

The determination unit 43 compares the set standard travel area with the trajectory of the vehicle 2 to determine whether the trajectory of the vehicle 2 is within the standard travel area. When the trajectory is within the standard travel area over the whole predetermined section, the determination unit 43 determines that the trajectory is within the standard travel area. When the trajectory deviates from the standard travel area at a position in the predetermined section, the determination unit 43 determines that the trajectory deviates from the standard travel area.

The high-precision map may also include information representing a reference trajectory of an individual lane in the predetermined section. The reference trajectory of an individual lane is a standard trajectory along which a vehicle travels through the lane unless there is a special reason. For example, the reference trajectory is set by averaging multiple trajectories of vehicles that have actually traveled through the lane. Alternatively, the reference trajectory may be set so as to pass along the center of the lane.

In this case, the standard travel area of an individual lane may be an area centered on a reference trajectory of the lane and included within a predetermined acceptable distance of the reference trajectory. The acceptable distance of an individual lane is set to a distance shorter than the width from the reference trajectory of the lane to a lane line defining the lane by the predetermined safety distance. Thus, at each position on the trajectory, the determination unit 43 calculates the distance from the position to the reference trajectory as a deviation of the trajectory from the reference trajectory at the position. When the deviation is not greater than the acceptable distance at any position on the trajectory, the determination unit 43 determines that the trajectory is within the standard travel area. When the deviation is greater than the acceptable distance at a position on the trajectory, the determination unit 43 determines that the trajectory deviates from the standard travel area.

The determination unit 43 notifies the trajectory information generating unit 44 of individual position coordinates included in the trajectory of the vehicle 2 and the times when the vehicle 2 is at the respective positions (i.e., the times of generation of images or positioning information respectively corresponding to the times of detection of the individual positions). The determination unit 43 further notifies the trajectory information generating unit 44 of the result of determination whether the trajectory is within the standard travel area.

The trajectory information generating unit 44 generates trajectory information representing a trajectory along which the vehicle 2 has traveled through a predetermined section. In the present embodiment, when the trajectory is within the standard travel area, the trajectory information generating unit 44 generates trajectory information by including individual position coordinates on the trajectory in the trajectory information. When the trajectory deviates from the standard travel area, the trajectory information generating unit 44 generates trajectory information by including individual position coordinates on the trajectory and operation information at the individual positions in the trajectory information. In this case, for each position on the trajectory, the trajectory information generating unit 44 determines operation information corresponding to the time closest to the time when the vehicle 2 is at the position, as the operation information at the position. This enables identifying a reason why the trajectory of the vehicle 2 is an abnormal trajectory deviating from the standard travel area. The trajectory information generating unit 44 may include operation information obtained between entry of the vehicle 2 into the predetermined section and an exit from the predetermined section in the trajectory information, without associating the operation information with individual positions on the trajectory.

Figure 5B:
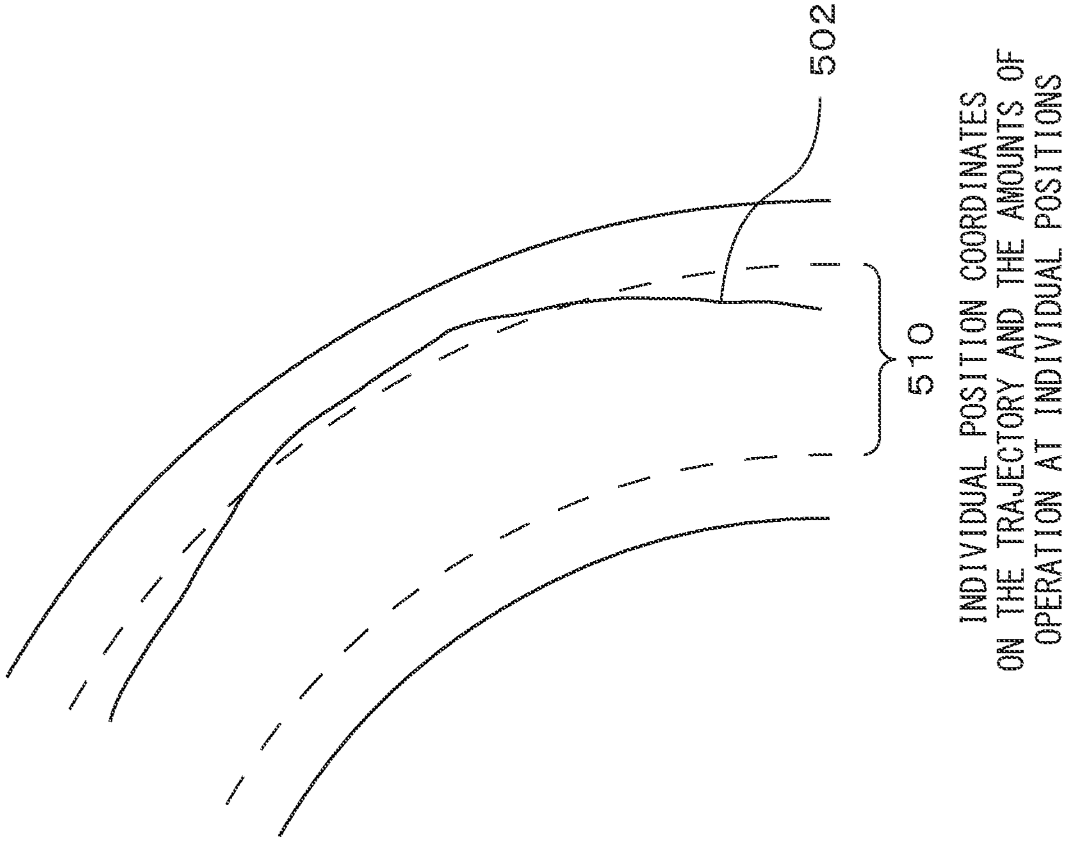
FIG. 5B illustrates another example of a trajectory to be collected.
Figure 5A:
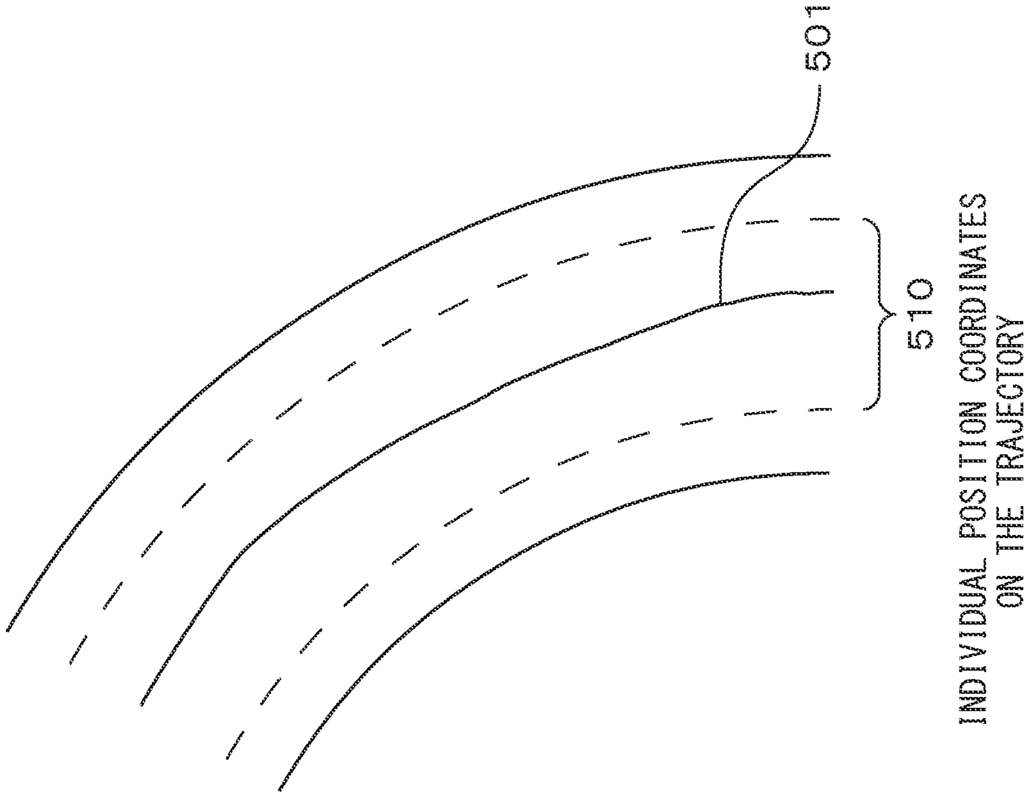
FIG. 5A illustrates an example of a trajectory to be collected.

FIGS. 5A and 5B illustrate examples of a trajectory to be collected. In the example illustrated in FIG. 5A, a trajectory 501 is within a standard travel area 510. Thus, individual position coordinates on the trajectory 501 are included in trajectory information.

In the example illustrated in FIG. 5B, part of a trajectory 502 is outside the standard travel area 510. Thus, not only individual position coordinates on the trajectory 502 but also operation information at these individual positions is included in trajectory information.

When the trajectory deviates from the standard travel area, the trajectory information generating unit 44 may further include at least one of a flag indicating that the trajectory deviates from the standard travel area, information representing the standard travel area, or position coordinates where the trajectory deviates from the standard travel area, in the trajectory information.

Further, the processor 33 may receive information indicating the speed and the acceleration or deceleration of the vehicle 2 from the ECU 24 during a period between entry of the vehicle 2 into the predetermined section and an exit from the predetermined section. When the trajectory deviates from the standard travel area, the trajectory information generating unit 44 may include at least one of the speed or the acceleration or deceleration of the vehicle 2 during the period in the trajectory information. This enables analysis of motion of the vehicle 2 when the trajectory of the vehicle 2 is an abnormal trajectory deviating from the standard travel area.

When the trajectory deviates from the standard travel area, the trajectory information generating unit 44 may further include relative position information on the relationship between a vicinity vehicle detected by the vehicle detection unit 42 and the vehicle 2 during travel of the vehicle 2 through the predetermined section, in the trajectory information. This enables determining whether the trajectory of the vehicle 2 is an abnormal trajectory because of the positional relationship between the vicinity vehicle and the vehicle 2.

The trajectory information generating unit 44 passes the generated trajectory information to the communication processing unit 45.

When trajectory information is received, the communication processing unit 45 transmits the trajectory information to the server 4 via the wireless communication terminal 23. The communication processing unit 45 may transmit trajectory information immediately after the vehicle 2 exits a predetermined section, but the timing of transmission of trajectory information is not limited thereto and may be other timing. For example, the communication processing unit 45 may transmit trajectory information at timing when the ignition switch of the vehicle 2 is turned off.

The communication processing unit 45 may further transmit a series of images generated during travel of the vehicle 2 through a predetermined section or sub-images cut out from the series of images to the server 4 via the wireless communication terminal 23. The communication processing unit 45 may further transmit data representing a predetermined feature, such as a lane line, detected from each of a series of images generated during travel of the vehicle 2 through a predetermined section to the server 4 via the wireless communication terminal 23.

Figure 6:
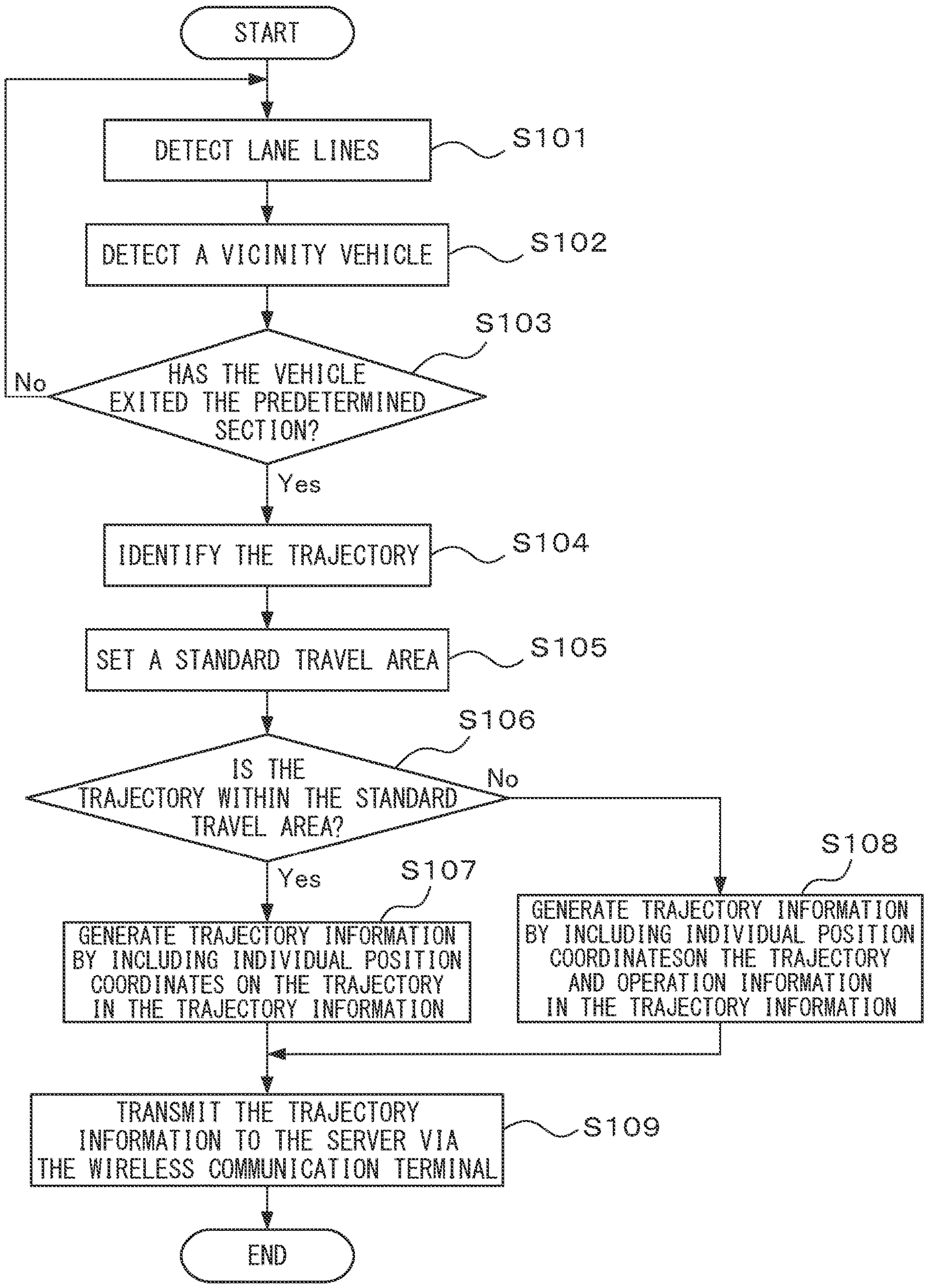
FIG. 6 is an operation flowchart of a trajectory information collecting process.

FIG. 6 is an operation flowchart of the trajectory information collecting process. Upon entry of the vehicle 2 into a predetermined section, the processor 33 executes the trajectory information collecting process in accordance with the operation flowchart described below.

The detection unit 41 of the processor 33 detects lane lines defining a host vehicle lane (step S101). The vehicle detection unit 42 of the processor 33 detects a vicinity vehicle (step S102).

The determination unit 43 of the processor 33 determines whether the vehicle 2 has exited the predetermined section (step S103). When the vehicle 2 has not exited the predetermined section (No in step S103), the processor 33 repeats the processing of step S101 and the subsequent steps.

When the vehicle 2 exits the predetermined section (Yes in step S103), the determination unit 43 identifies the trajectory of the vehicle 2 in the predetermined section (step S104). The determination unit 43 further sets a standard travel area, based on the lane lines defining the host vehicle lane (step S105). When a high-precision map is available, the determination unit 43 may set a standard travel area, based on the high-precision map. The determination unit 43 then determines whether the trajectory of the vehicle 2 is within the standard travel area (step S106).

When the trajectory of the vehicle 2 is within the standard travel area (Yes in step S106), the trajectory information generating unit 44 of the processor 33 generates trajectory information by including individual position coordinates on the trajectory in the trajectory information (step S107). When the trajectory of the vehicle 2 deviates from the standard travel area (No in step S106), the trajectory information generating unit 44 generates trajectory information by including individual position coordinates on the trajectory and operation information at the individual positions in the trajectory information (step S108). In step S108, the trajectory information generating unit 44 may include information indicating motion of the vehicle 2, such as the speed or the acceleration or deceleration of the vehicle 2, or relative position information on the relationship between the vehicle 2 and the vicinity vehicle in the trajectory information, as described above.

After step S107 or S108, the communication processing unit 45 of the processor 33 transmits the trajectory information to the server 4 via the wireless communication terminal 23 (step S109). The processor 33 then terminates the trajectory information collecting process.

The server 4 generates or updates a high-precision map, based on trajectory information received from the trajectory information collecting device 3 of each vehicle 2. For example, a processor of the server 4 averages multiple trajectories included in a standard travel area for each lane in a predetermined section to determine a reference trajectory of the lane in the predetermined section. The processor of the server 4 includes information representing the reference trajectories determined for the respective lanes in the high-precision map. The processor of the server 4 may further include information representing a trajectory deviating from the standard travel area in the high-precision map for each lane in the predetermined section. Further, the processor of the server 4 may analyze operation information included in trajectory information of a trajectory deviating from the standard travel area.

As has been described above, the trajectory information collecting device determines whether a trajectory along which a vehicle has traveled through a predetermined section is within a predetermined standard travel area. When the trajectory is within the standard travel area, the trajectory information collecting device generates trajectory information by including individual position coordinates on the trajectory in the trajectory information. When the trajectory deviates from the standard travel area, the trajectory information collecting device generates trajectory information by including not only individual position coordinates on the trajectory but also operation information indicating how much the vehicle is operated by a driver in the trajectory information. The trajectory information collecting device can therefore collect information on an abnormal trajectory of a vehicle. In addition, the trajectory information collecting device can prevent an unnecessary increase in the amount of data transmitted to the server by excluding unnecessary information on a normal trajectory included in the standard travel area from the trajectory information.

According to a modified example, the processing of the vehicle detection unit 42 may be omitted in the case where the trajectory information generating unit 44 excludes relative position information on the relationship between the vehicle 2 and a vicinity vehicle from the trajectory information even if the trajectory of the vehicle 2 deviates from the standard travel area. The processing of the detection unit 41 may also be omitted in the case where the standard travel area is set based on a high-precision map and where lane lines are not used for detecting the position of the vehicle 2.

The computer program causing a computer to achieve the functions of the units included in the processor of the trajectory information collecting device according to the above-described embodiment or modified example may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present disclosure.

What is claimed is:

1. A vehicle comprising:

an electronic control unit; and a trajectory information collecting device comprising:

a processor configured to:

determine whether a trajectory along which a host vehicle has traveled through a predetermined section is within a predetermined standard travel area, generate trajectory information by including individual position coordinates on the trajectory in the trajectory information when the trajectory is within the standard travel area, generate the trajectory information by including individual position coordinates on the trajectory and operation information indicating how much the host vehicle is operated by a driver of the host vehicle in the predetermined section in the trajectory information when the trajectory deviates from the standard travel area, set the standard travel area based on two lane lines defining a host vehicle lane;

determine real-space positions of the two lane lines based on one or more parameters of a camera, and a position and an orientation of the vehicle;

connect the two lane lines detected from each image of the camera and projected into the real space;

transmit the trajectory information to a server via a communication device mounted on the host vehicle; and the electronic control unit configured to control the vehicle in accordance with one or more operations.

2. The vehicle according to claim 1, wherein the trajectory information collecting device further comprises a memory configured to store information representing a reference trajectory in the predetermined section, wherein the processor determines that the trajectory deviates from the standard travel area, when a deviation of the trajectory from the reference trajectory at a position on the trajectory is greater than a predetermined acceptable distance corresponding to the standard travel area.

3. The vehicle according to claim 1, wherein the processor is further configured to:

detect another vehicle traveling in an area around the host vehicle during travel of the host vehicle in the predetermined section from a sensor signal representing surroundings of the host vehicle obtained by a sensor mounted on the host vehicle, and estimate the relationship of a position of the detected vehicle to the host vehicle, wherein the processor includes relative position information indicating the relationship of the position of the detected vehicle to the host vehicle at a position on the trajectory in the trajectory information when the trajectory deviates from the standard travel area.

4. The vehicle according to claim 1, wherein the processor is configured to:

determine whether the vehicle has entered a predetermined section; and execute a trajectory information collecting process upon entry of the vehicle into the predetermined section, the predetermined section corresponding to a road section including a curved section, an intersection, a merge point, or a divergent point.

5. The vehicle according to claim 1, wherein the processor is configured to detect the two lane lines at predetermined intervals by inputting a latest image obtained by the camera into a classifier that is trained to detect the two lane lines.

6. The vehicle according to claim 1, wherein the processor is configured to project features detected from each image onto a high-precision map in response to storing the high-precision map, and compare each image with the high-precision map to detect a position of the vehicle at a time of generation of the image.

7. A method for collecting trajectory information, comprising:

determining whether a trajectory along which a host vehicle has traveled through a predetermined section is within a predetermined standard travel area;

generating trajectory information by including individual position coordinates on the trajectory in the trajectory information when the trajectory is within the standard travel area;

generating the trajectory information by including individual position coordinates on the trajectory and operation information indicating how much the host vehicle is operated by a driver of the host vehicle in the predetermined section in the trajectory information when the trajectory deviates from the standard travel area;

setting the standard travel area based on two lane lines defining a host vehicle lane;

determining real-space positions of the two lane lines based on one or more parameters of a camera, and a position and an orientation of the vehicle;

connecting the two lane lines detected from each image of the camera and projected into the real space;

transmitting the trajectory information to a server via a communication device mounted on the host vehicle; and controlling the vehicle in accordance with one or more operations.

8. A non-transitory recording medium that stores a computer program for collecting trajectory information, the computer program causing a computer to execute a process comprising:

determining whether a trajectory along which a host vehicle has traveled through a predetermined section is within a predetermined standard travel area;

generating trajectory information by including individual position coordinates on the trajectory in the trajectory information when the trajectory is within the standard travel area;

generating the trajectory information by including individual position coordinates on the trajectory and operation information indicating how much the host vehicle is operated by a driver of the host vehicle in the predetermined section in the trajectory information when the trajectory deviates from the standard travel area;

setting the standard travel area based on two lane lines defining a host vehicle lane;

determining real-space positions of the two lane lines based on one or more parameters of a camera, and a position and an orientation of the vehicle;

connecting the two lane lines detected from each image of the camera and projected into the real space;

transmitting the trajectory information to a server via a communication device mounted on the host vehicle; and controlling the vehicle in accordance with one or more operations.

* * * * *